(12) United States Patent
Miyazaki

(10) Patent No.: US 7,031,106 B2
(45) Date of Patent: Apr. 18, 2006

(54) SEALING MEMBER, ROLLING BEARING, THIN MOTOR, AND BEARING DEVICE

(75) Inventor: Seizo Miyazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/774,576

(22) Filed: Feb. 1, 2001

(65) Prior Publication Data

US 2002/0159663 A1 Oct. 31, 2002

(30) Foreign Application Priority Data

| Feb. 1, 2000 | (JP) | ............................ P. 2000-024371 |
| Aug. 11, 2000 | (JP) | ............................ P. 2000-243733 |
| Jan. 5, 2001 | (JP) | ............................ P. 2001-000770 |

(51) Int. Cl.
*G11B 17/02* (2006.01)

(52) U.S. Cl. .............................. 360/99.08; 360/98.07; 384/477; 384/480; 384/489; 277/549

(58) Field of Classification Search ................ 384/477, 384/484, 486, 489, 488, 480; 277/549, 550, 277/551, 556; 360/99.08, 99.07, 99.04
See application file for complete search history.

(56) References Cited

U.S. PATENT DOCUMENTS

| 4,632,576 A | * | 12/1986 | Neal | ............................ | 384/537 |
| 4,805,919 A | * | 2/1989 | Wiblyi et al. | ................ | 277/152 |
| 5,017,024 A | * | 5/1991 | Clark et al. | .................. | 383/482 |
| 5,119,446 A | * | 6/1992 | Grafstrom et al. | .......... | 384/484 |
| 5,132,856 A | * | 7/1992 | Takahashi | ................ | 360/99.08 |
| 5,270,887 A | * | 12/1993 | Edwards et al. | ......... | 360/97.03 |
| 5,383,728 A | * | 1/1995 | Micca et al. | ................ | 384/482 |
| 5,434,730 A | * | 7/1995 | Shishido | .................... | 360/99.08 |
| 5,452,156 A | * | 9/1995 | Uda et al. | ................ | 360/97.01 |
| 5,585,224 A | * | 12/1996 | Makita et al. | .............. | 430/323 |
| 5,596,235 A | * | 1/1997 | Yazaki et al. | ............. | 310/67 R |
| 5,882,121 A | * | 3/1999 | Saigusa | ...................... | 384/488 |
| 6,038,205 A | * | 3/2000 | Katakura et al. | ........ | 360/99.08 |
| 6,062,734 A | * | 5/2000 | Bundgart | .................... | 384/477 |
| 6,204,996 B1 | * | 3/2001 | MacLeod | ................. | 360/99.08 |

FOREIGN PATENT DOCUMENTS

JP 6-14490 A * 1/1994 .................. 310/85

* cited by examiner

Primary Examiner—James McClellan
Assistant Examiner—Mariano Sy
(74) Attorney, Agent, or Firm—Sughrue Mion, PLLC

(57) ABSTRACT

The sealing members (14a, 14b) comprise a film member produced by forming an aluminum or alumina deposition film on at least one side surface of a film-like core material. One side surface outer circumferential rim part of the sealing members is bonded and fixed on the outer end surface of outer rings (9, 9) constituting the rolling bearings (4, 4).

14 Claims, 10 Drawing Sheets

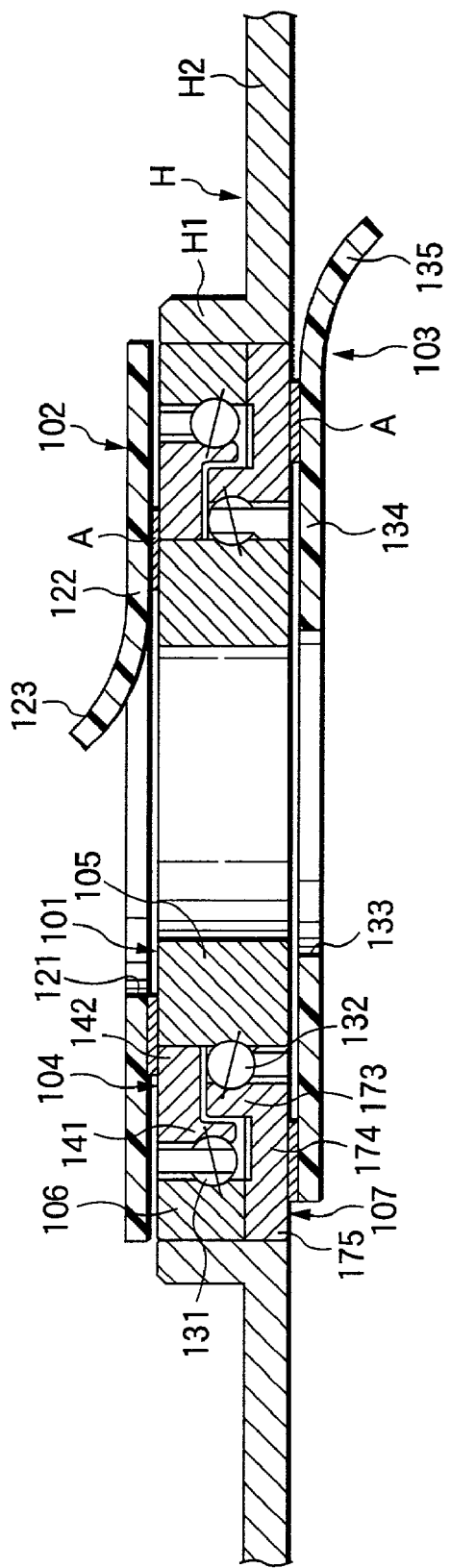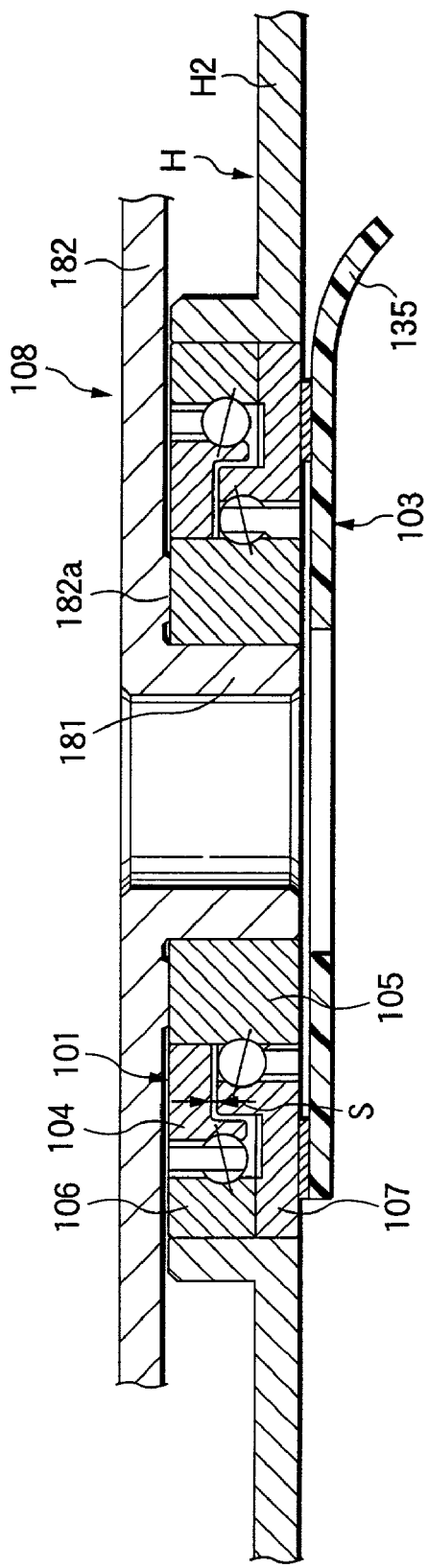

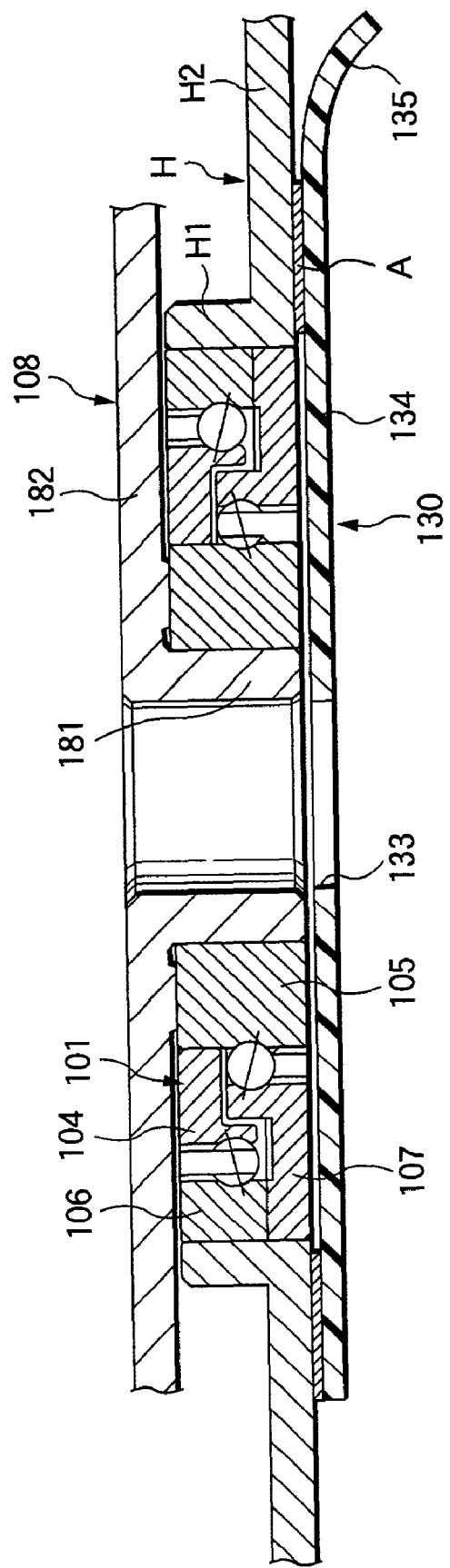

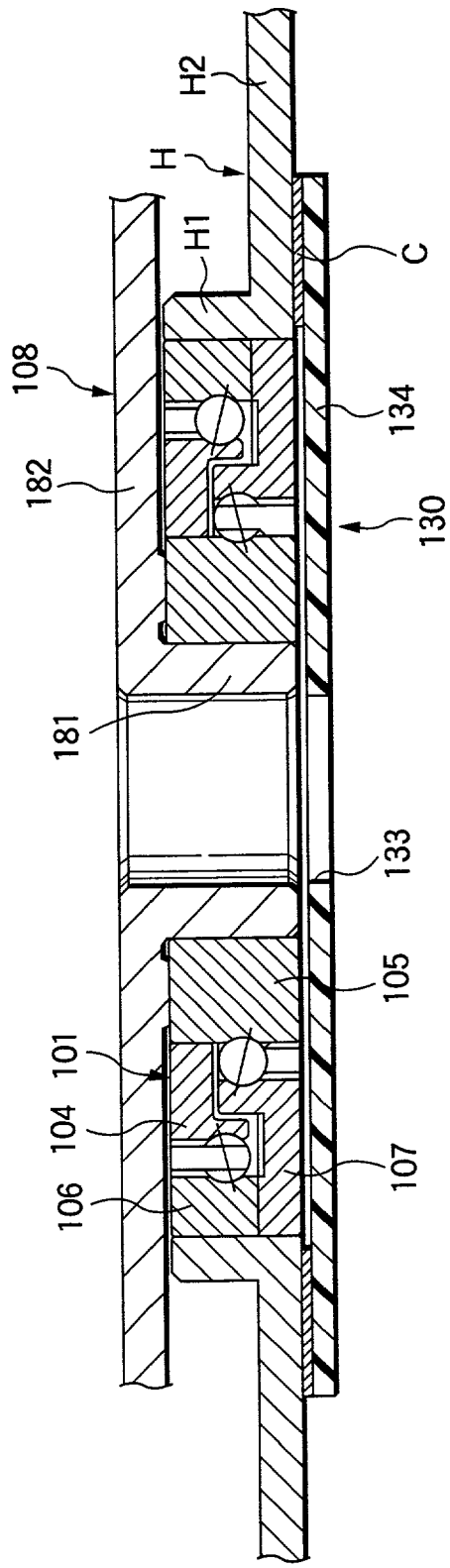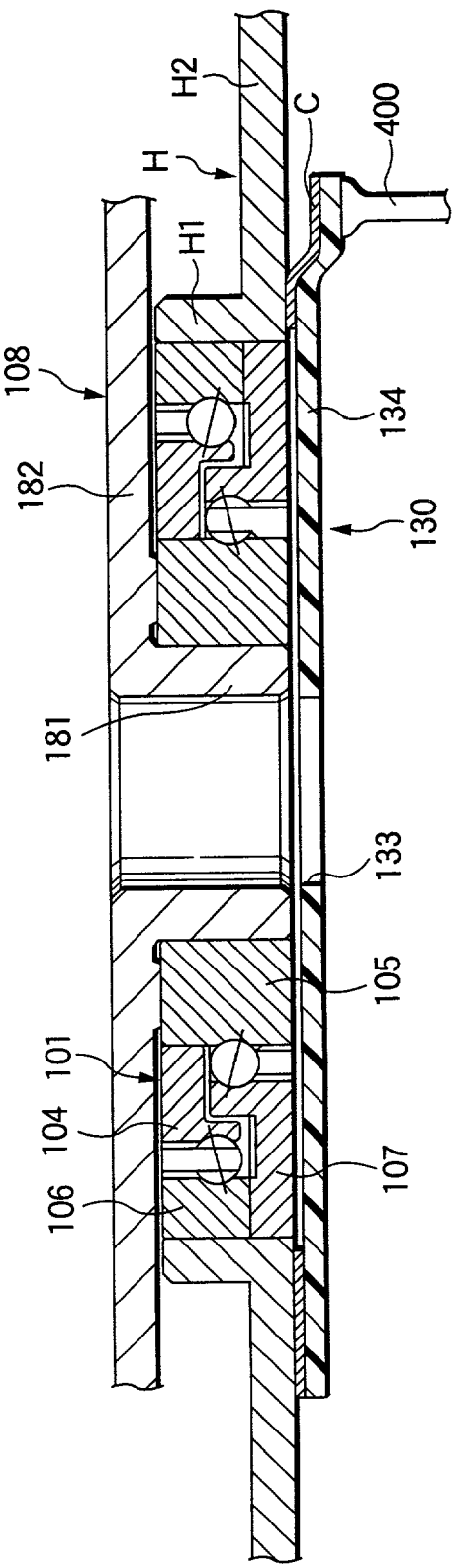

SEALING MEMBER, ROLLING BEARING, THIN MOTOR, AND BEARING DEVICE

BACKGROUND OF THE INVENTION

The present invention relates to a sealing member, a rolling bearing, a thin motor and a bearing device. The sealing member is used to close the end part opening of a space part having rolling elements of a rolling bearing. In addition, the rolling bearing is used for providing a rotation supporting part for various kinds of machinery. Further, the thin motor is used, for example, as a motor for rotation drive of various kinds of devices, such as a disc driving motor constituting a magnetic disc drive device including a hard disc drive device (HDD), and a floppy disc drive device (FDD), a cooling fan driving motor for an IC, and a polygon mirror driving motor for a laser beam printer (LBP).

The present invention also relates to a rolling bearing or a bearing device, specifically, it relates to that preferable as a small bearing or bearing device to be used for a spindle motor, a swing arm, a motor for an IC cooling fan, or the like, in information appliances such as a hard disc driving device, a floppy disc driving device, and an optical disc driving device.

For example, a hard disc is rotated by a direct drive type spindle motor at a high speed at the time of using an HDD as a memory device for a computer, or the like. A space part provided with a rolling element, of a rolling bearing constituting a rotation supporting part of such a spindle motor has a lubricating grease sealed therein so as to lubricate the rolling contact part between a plurality of rolling elements, and inner and outer ring raceway tracks. Furthermore, both end opening parts of the space provided with the plurality of the rolling elements are closed by a sealing member such as a sealing plate, and a shielding plate. Thereby, leakage of the grease from the space part provided with the rolling elements to the outside can be prevented as well as entrance of a foreign substance such as dusts and moisture into the space can be prevented.

In order to save the space inside a casing storing an HDD, or the like, a thin motor with a smaller axial direction size is used as the above-mentioned spindle motor. In the case of producing such a thin motor, the axial direction size of a rolling element to be assembled as a rotation supporting part of the thin motor needs to be made smaller. In order to have the axial direction size of the rolling bearing smaller, the axial direction size of an outer ring and an inner ring constituting the rolling bearing needs to be made smaller. In contrast, the diameter or the axial direction size of the plurality of the rolling elements cannot be made drastically smaller for ensuring the bearing load of the rolling bearing. Therefore, if the axial direction size of the rolling bearing is made smaller in consideration of the circumstances, the axial direction distance between the axial direction end surface of each of outer and inner rings and the rolling contact surface or the axial direction distance between the axial direction end surface of each of outer and inner rings and the axial direction end rim is made shorter. As a result, installation of an engaging groove, or the like for engaging the sealing member on the end part inner circumferential surface of the outer ring or the end part outer circumferential surface of the inner ring can be difficult, or even in the case the engaging groove can be provided, engagement of the sealing member with the engaging groove can be difficult due to interference by the rolling elements.

In addition, conventionally, as a bearing for a hard disc driving device, that having two ball bearings disposed via a spacer can be presented. Moreover, according to downsizing of a motor for the hard disc driving device, there is a demand for an extremely small bearing width (axial direction size) of, for example, 2 mm or less. In a bearing with such a small width, it is difficult to provide a seal in the bearing. In other words, if a seal is provided in a bearing, it is difficult to have an extremely small bearing width of, for example, 2 mm or less.

In the case a seal is not provided in a bearing, a problem is involved in that dusts can easily enter into the bearing at the time of assembling the bearing with a shaft and a housing, or at the time of mounting a bearing device with the bearing disposed between an axis side member and a housing onto a chassis. However, conventionally, a countermeasure has not been provided sufficiently therefor.

SUMMARY OF THE INVENTION

In view of the circumstances, the invention has been achieved for realizing a structure capable of assembling the sealing member easily even in the case the axial direction size of the rolling bearing is made sufficiently small.

Further, an object of the invention is to prevent entrance of dusts into the bearing at the time of assembling a rolling bearing not provided with a seal therein with an axis and a housing, or the like.

Among the sealing member, the rolling bearing and the thin motor according to the invention, the sealing member according to the same is fixed on a bearing ring such as an outer ring and an inner ring in the state with at least a part of the end part opening of a space having a plurality of rolling elements provided between the inner circumferential surface of an outer ring and the outer circumferential surface of an inner ring constituting a rolling bearing closed.

In particular, in the sealing member according to the present invention, a film member produced by forming an aluminum or alumina film on at least one side surface of a film-like core material is used with a shape covering at least a part of the end part opening, and in the state with a part of the side surface bonded and fixed on the axial direction end surface of the bearing ring.

As the film material, for example, those produced by forming a deposition film or a coating film made from an aluminum or an alumina (aluminum oxide) on at least one (preferably both) side surface of a core material made of, for example, a polypropylene film, a polyethylene film, a polyester film, or the like can be used.

Moreover, a rolling bearing according to the present invention comprises an outer ring having an outer ring raceway track on the inner circumferential surface, an inner ring having an inner ring raceway track on the outer circumferential surface, a plurality of rolling elements provided between the inner circumferential surface of the outer ring and the outer circumferential surface of the inner ring, and a sealing member for sealing the end part opening of a space having the plurality of the rolling elements provided between the inner circumferential surface of the outer ring and the outer circumferential surface of the inner ring.

In particular, in the rolling bearing according to the present invention, the sealing member is the sealing member having to the above-mentioned structure, and a part of a side surface of the sealing member is bonded and fixed on the axial direction end surface of a bearing ring as being one of the outer ring and the inner ring.

In the case of using the rolling bearing according to the present invention assembled in the thin motor described below, preferably, the plurality of the rolling elements are balls as well as at least either one selected from the group consisting of each ball diameter 0.6 times or more as much as the outer ring and inner ring axial direction size, and 2 mm or less each ball diameter is adopted.

Furthermore, a thin motor according to the present invention comprises a first member with a stator supported and fixed, and a second member with a rotor facing the stator supported and fixed, combined relatively rotatably with each other by a rolling bearing, with the outer diameter size of the rotor 7 times or more as much as the axial direction size of the motor as a whole.

In particular, in the thin motor according to the present invention, the rolling bearing is the above-mentioned rolling bearing according to the present invention.

In the case of using the thin motor according to the present invention, preferably, the axial direction size of the thin motor is 5 mm or less.

In the case of the sealing member, the rolling bearing and the thin motor according to the invention with the above-mentioned configurations, in assembling the sealing member on the rolling bearing, a part of one side surface of the sealing member is bonded and fixed on the axial direction end surface of a bearing ring as one of the outer ring and the inner ring, which constitute the rolling bearing. Therefore, even in the case the axial direction distance between the axial direction end surface of the outer ring and the inner ring, and the rolling contact surface of the plurality of the rolling elements is made shorter by having the rolling bearing axial direction size smaller, the sealing member can be assembled easily on the rolling bearing. In the case of the invention, the sealing member is formed with a film material having an extremely small thickness size. Therefore, even in the case of fixing the sealing member on the axial direction end surface of one of the bearing rings as mentioned above, the axial direction size of the rolling bearing, or the axial direction size of a thin motor with the rolling bearing assembled cannot be bulky.

The film material produced by forming an aluminum or alumina film on at least one side surface of a film-like core material constituting the sealing member according to the invention has a good foreign substance blocking performance, such as a gas barrier property as well as an extremely small performance change by heat, moisture, or aging. Therefore, a good sealing performance can be obtained in terms of the corrosion prevention for the rolling element installation part constituting the rolling bearing, the deterioration prevention of a grease sealed inside the rolling element installation part, or the like as well as the good sealing performance can be maintained over a long time. Furthermore, also in the case of using an adhesive having a stickiness is used for bonding and fixing the sealing member on the axial direction end surface of one of the bearing rings, drying of the adhesive can be prevented effectively, and thus the bonding force (adhesion force) of the adhesive can be maintained over a long time.

In order to achieve the object, the invention provides a rolling bearing with a gap between an inner ring and an outer ring which is covered externally with a sheet, wherein the sheet is bonded on the end surface of the inner ring and/or the outer ring by a detachable bonding force.

Moreover, the invention provides a bearing device comprising a rolling bearing disposed between an axis side member and a housing, wherein the axis side member comprises a cylindrical part with an inner ring mounted externally and an axis mounted internally, and an outward flange part disposed on one end side in the axial direction, for covering one side surface of the bearing, and the housing comprises a ring part with the outer ring mounted internally, and an outward flange part disposed on the other end part in the axial direction, with a gap between the inner ring and the outer ring is covered with a sheet externally on the other end side in the axial direction, and the sheet bonded on at least either of the outward flange part of the housing, the inner ring and the outer ring by a detachable bonding force.

In the invention, the "detachable bonding force" denotes a bonding force in a degree not to be peeled off at the time of handling as a rolling bearing or a bearing device, but to be peeled off at the time of applying an appropriate peeling force.

It is preferable that the sheet is bonded by an adhesive having the bonding force to be lowered by ultraviolet ray irradiation or by heat application. Thereby, even when the bonding force of the adhesive is considerably high, the bonding force is lowered by the ultraviolet ray irradiation or by the heat application so that the sheet can easily be peeled off. Therefore, by having the bonding force of the adhesive considerably high, the sheet is not peeled off at the time of handling as a rolling bearing or a bearing device, but it can be peeled off easily at the time of peeling off the sheet.

BRIEF DESCRIPTION OF THE DRAWINGS

FIGS. 9A and 9B are a cross-sectional view showing a rolling bearing and a bearing device according to a fourth embodiment of the invention;

FIG. 10 is a cross-sectional view showing a bearing device according to a fifth embodiment of the invention;

FIGS. 12A and 12B are a cross-sectional view showing a bearing device according to a seventh embodiment of the invention;

DETAILED DESCRIPTIONS OF THE PREFERRED EMBODIMENTS

Figure 1:
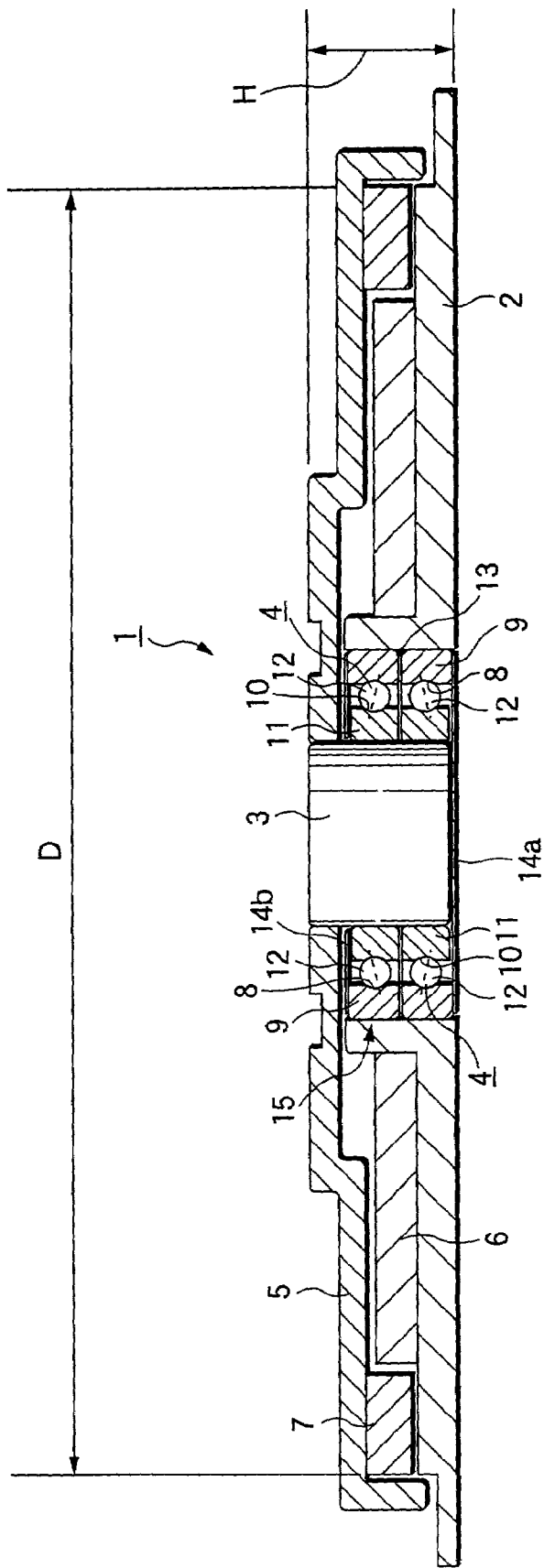
FIG. 1 is a cross-sectional view of a thin motor of a first embodiment of the invention.
Figure 2:
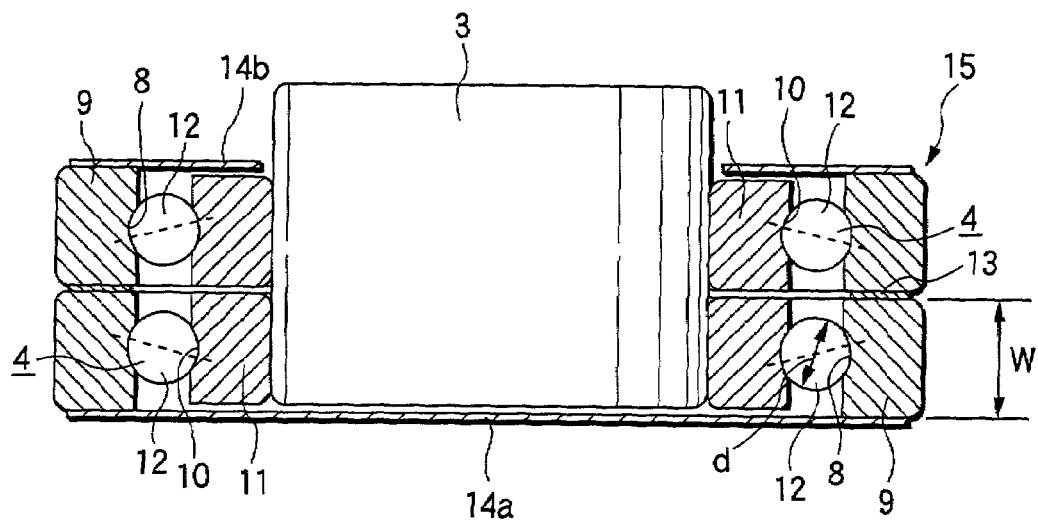
FIG. 2 is an enlarged cross-sectional view of a pair of rolling bearings and a rotation axis.
Figure 3:
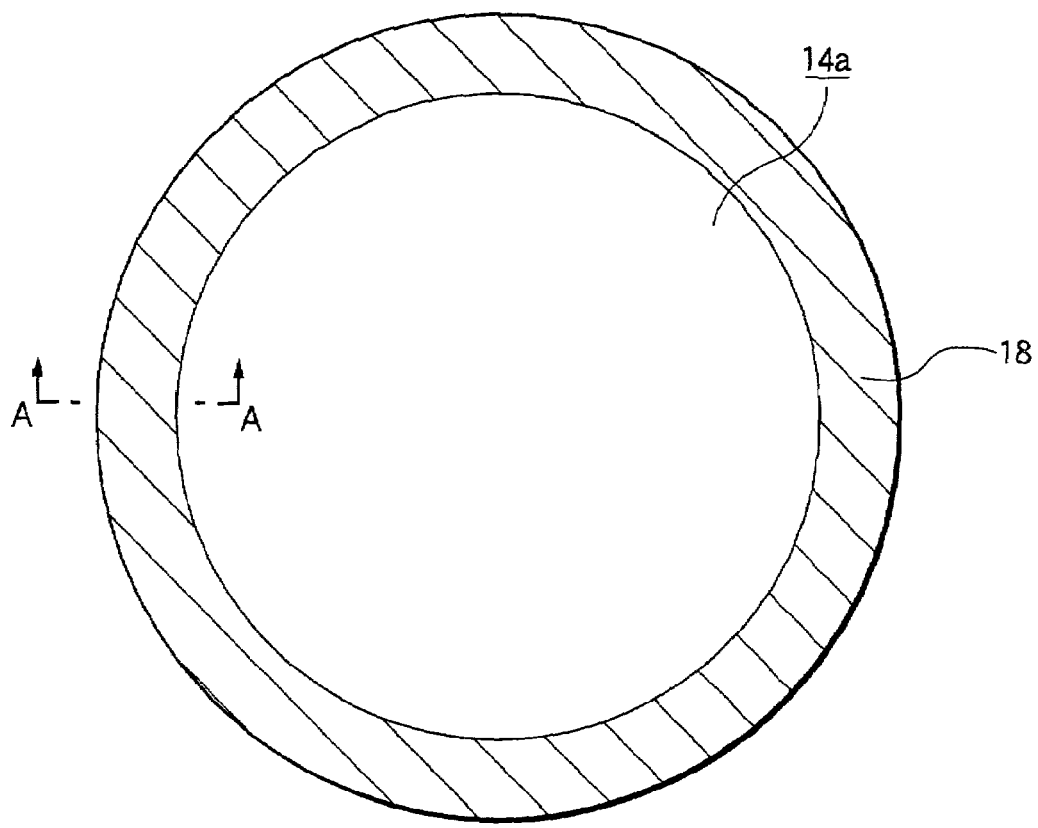
FIG. 3 is a side view of the lower sealing member of FIGS. 1 to 2.
Figure 4:
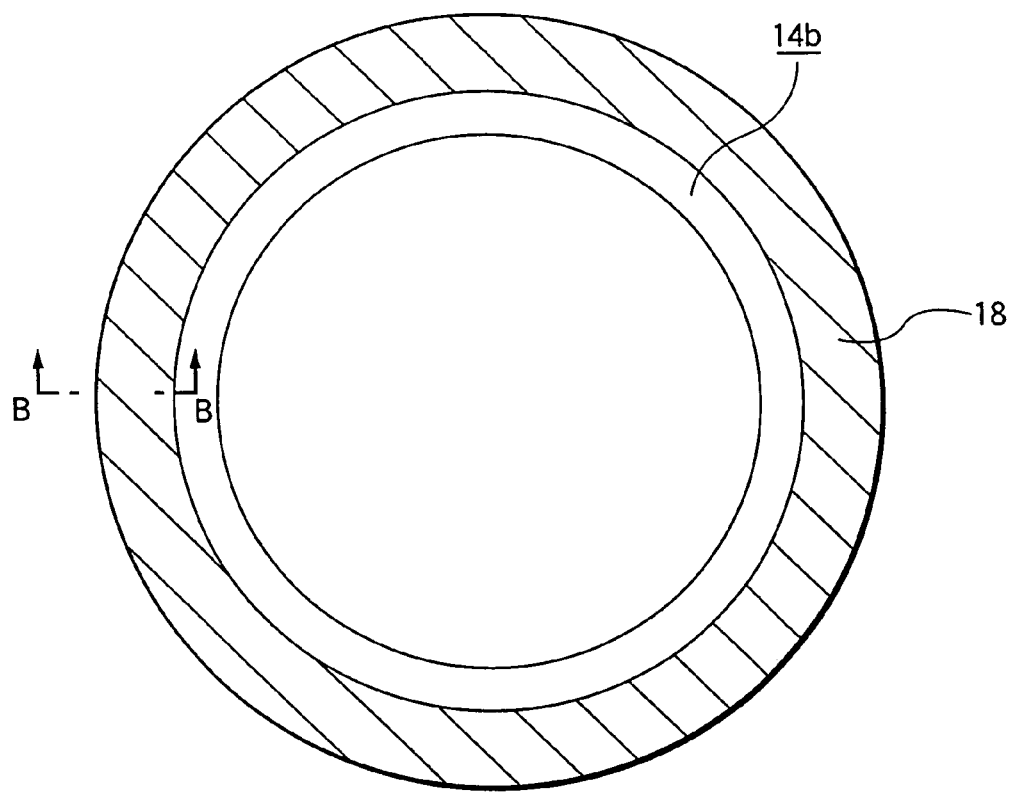
FIG. 4 is a side view of the upper sealing member of FIGS. 1 to 2.
Figure 5:
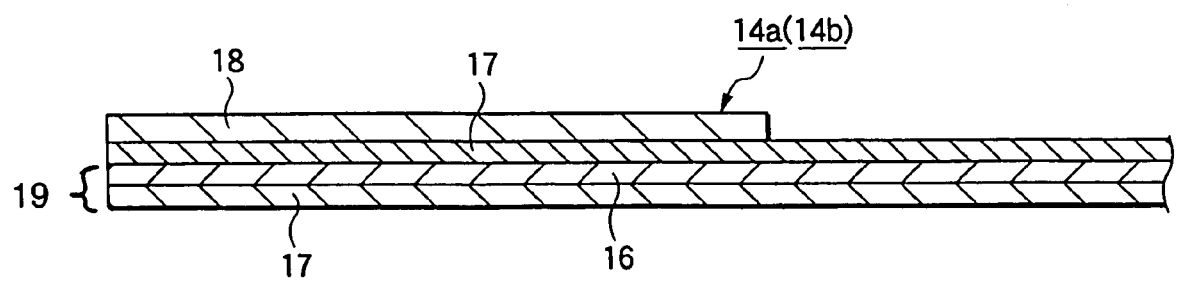
FIG. 5 is an enlarged cross-sectional view taken on the line A—A of FIG. 3, and the line B—B of FIG. 4.

FIGS. 1 to 5 show a first embodiment of the invention. A thin motor 1 of this embodiment has a rotation axis (second member) 3 supported rotatably by a pair of rolling bearings 4, 4 on the inner diameter side of a fixing member (housing=first member) 2 formed in a substantially round ring-like shape as a whole. Moreover, a rotating member (hub=second member) 5 formed in a substantially round ring-like shape as a whole is fitted externally and fixed with the part of one end part (upper end part in FIGS. 1 to 2) of the rotation axis 3, projecting from the upper (The up and down direction here denotes the direction in the figures, and thus the practical use state is not limited thereby. The same is applied throughout the entirety of the specification.) rolling bearing 4. The outer circumferential surface of a stator 6 fixed on the upper surface inner diameter side part of the fixing member 2 and the inner circumferential surface of a rotor 7 fixed on the lower surface outer diameter side part of the rotating member 5 are faced with each other in the diameter direction. In the case of this embodiment, the axial direction size H of the thin motor 1 with the configuration is formed to be 5 mm or less as well as the outer diameter size D of the rotor 7 is formed to be 7 times or more as much as the axial direction size H of the thin motor 1 ($D \geqq 7H$).

Furthermore, the pair of the rolling bearings 4, 4 constituting the thin motor 1 are disposed adjacent with each other into the back-to-back duplex state so as to provide a double row rolling bearing 15. Each of the pair of the rolling bearings 4, 4 comprises an outer ring 9 having a deep groove type outer ring raceway track 8 on the inner circumferential surface, an inner ring 11 having a deep groove type inner ring raceway track 10 on the outer circumferential surface, and a plurality of balls (rolling elements) 12, 12 provided rollably between the outer ring raceway track 8 and the inner ring raceway track 10. The outer rings 9, 9 constituting the pair of the rolling bearings 4, 4, in the assembly state shown in the figure are fitted internally and fixed with the fixing member 2 by interference fit or bonding as well as a round ring-like spacer 13 is held between the outer rings 9, 9. In the state with the spacer 13 held between the outer rings 9, 9, a gap is formed between the end surfaces facing with each other of the inner rings 11, 11 constituting the pair of the rolling bearings 4, 4.

In contrast, the inner rings 11, 11 in the state compressed toward each other are fitted externally and fixed with the other end side (lower end side in FIGS. 1 to 2) part of the rotation axis 3 by interference fit or bonding. In this state, a preliminary pressure is applied to the balls 12, 12. Moreover, the size of each part is limited such that the outer end surfaces (the end surfaces at the side not facing with each other) of the inner rings 11, 11 are each disposed on the width direction (the up and down direction in FIG. 1) center side of the double row rolling bearing 15 with respect to the outer end surfaces (similarly, the end surfaces at the side not facing with each other) of the outer rings 9, 9 in this state. Furthermore, the other end surface of the rotation axis 3 is disposed on the same plane with respect to the lower inner ring 11. In the case of this embodiment, a smaller size of the rolling bearings 4, 4 is achieved in the axial direction by limiting the size of each part such that the diameter d of the balls 12, 12 is 2 mm or less as well as the diameter d of the balls 12, 12 is 0.6 times or more as much as the axial direction size W of the outer ring 9 and the inner ring 11 and less than the size W ($W > d \geqq 0.6W$). The diameter d and the axial direction size W are designed in consideration of having the axial direction size H of the thin motor 1 to be 5 mm or less as mentioned above.

Moreover, in the above-mentioned double row rolling bearing 15 constituting the pair of the rolling bearings 4, 4, both end opening parts of the space provided with the plurality of the balls 12, 12 are closed each by sealing members 14a, 14b. In the case of this embodiment, the sealing members 14a, 14b comprise a film member 19 produced by forming a deposition film 17 (coating film) made from an aluminum or an alumina (aluminum oxide) on at least one side surface (on both side surfaces in the embodiment shown in the figure) of a core material 16 made of a polypropylene film, a polyethylene film, a polyester film, or the like.

That is, among the sealing members 14a, 14b, the sealing member 14a for closing the lower end opening of the space is formed in a round shape with the film material 19. The sealing member 14a closes the lower end opening of the space in the state with the outer circumferential rim part of the side surface (upper side surface in FIGS. 1 to 2) bonded and fixed on the outer end surface (lower end surface in FIGS. 1 to 2) of the lower outer ring 9. As mentioned above, the outer end surface of the lower inner ring 11 and the other end surface of the rotation axis 3 are disposed on the center side in the width direction of the double row rolling bearing 15 with respect to the outer end surface of the lower outer ring 9. Therefore, one side surface inner diameter side part of the sealing member 14a fixed as mentioned above cannot interfere with the outer end surface of the lower inner ring 11 or the other end surface of the rotation axis 3. Moreover, in the case of this embodiment, the adhesive 18 for bonding and fixing the sealing member 14a is preliminarily applied on the part facing the outer end surface of the lower outer ring 9 (part shown by the oblique checkers in FIG. 4) on one side surface outer circumferential rim part of the sealing member 14a. However, the adhesive 18 can be applied on the outer end surface of the lower outer ring 9 instead of applying on one side surface of the sealing member 14a.

In contrast, the sealing member 14b for closing the upper end opening of the space is formed in a round shape with the film material 19. The sealing member 14b similarly closes the upper end opening of the space in the state with the outer circumferential rim part of the side surface (lower side surface in FIGS. 1 to 2) bonded and fixed on the outer end surface (upper end surface in FIGS. 1 to 2) of the upper outer ring 9. Moreover, in this state, the inner diameter side part of the sealing member 14b is superimposed on the outer diameter side part of the upper inner ring 11 in the axial direction. As mentioned above, the outer end surface of the upper inner ring 11 is disposed on the center side in the width direction of the double row rolling bearing 15 with respect to the outer end surface of the upper outer ring 9. Therefore, the inner diameter side part of the sealing member 14b fixed as mentioned above cannot interfere with the outer end surface of the upper inner ring 11. Moreover, in the case of this embodiment, the adhesive 18 for bonding and fixing the sealing member 14b is preliminarily applied on the part facing the outer end surface of the upper outer ring 9 (part shown by the oblique checkers in FIG. 4) on one side surface outer circumferential rim part of the sealing member 14b. Also in this case, the adhesive 18 can be applied on the outer end surface of the upper outer ring 9 instead of applying on one side surface of the sealing member 14b.

Moreover, in the case of this embodiment, the outer rings 9, 9 constituting the double row rolling bearing 15 can be formed integrally as in the third embodiment described later (see FIG. 7).

In the case of assembling the thin motor 1 with the above-mentioned configuration to an HDD, an IC cooling fan, or the like, the fixing member 2 is fixed on a fixing part of a housing, or the like as well as a member to be rotated such as a hard disc, a fan, or the like is supported or fixed on the rotating member 5 directly or via another member.

In the case of the sealing members 14a, 14b, the bearings 4, 4 and the thin motor 1 of this embodiment with the above-mentioned configuration, at the time of assembling the sealing members 14a, 14b with the rolling bearings 4, 4, one side surface outer circumferential rim part of each of the sealing members 14a, 14b is bonded and fixed on the outer end surface of each of the outer rings 9, 9. Therefore, even in the case the axial direction distance between the axial direction end surface of the outer rings 9, 9 and the inner rings 11, 11, and the rolling contact surface of the plurality of the balls 12, 12 is made shorter by having the axial direction size of the rolling bearings 4, 4 sufficiently small, the sealing members 14a, 14b can be assembled easily on the rolling bearings 4, 4. In the case of this embodiment, the sealing members 14a, 14b are formed with the film material 19 having an extremely small axial direction thickness size (for example, several tens to several hundreds of μm). Therefore, even in the case of fixing the sealing members 14a, 14b on the axial direction end surface of each of the outer rings 9, 9 as mentioned above, the axial direction size of the rolling bearings 4, 4, or the axial direction size of the thin motor 1 with the rolling bearings 4, 4 assembled cannot be bulky.

Furthermore, in the case of this embodiment, as the sealing members 14a, 14b, those provided by applying adhesives 18, 18 on one side surface outer circumferential rim part of the sealing members 14a, 14b are used. Therefore, the handling property of the sealing members 14a, 14b can be provided preferably, and thus the assembling work of the sealing members 14a, 14b can be facilitated. In the case of this embodiment, the position for applying the adhesives 18, 18 is limited to the part facing the outer end surface of each of the outer rings 9, 9 in one side surface of the sealing members 14a, 14b. Therefore, even in the case the sealing members 14a, 14b are deflected so that the inner diameter side part of the sealing members 14a, 14b is contacted (slid) with the outer end surface of each of the inner rings 11, 11, or the base end surface of the rotation axis 3, the adhesives 18, 18 cannot be adhered on the contacted part. Therefore, even in the case of the contact, the rotation resistance of the rolling bearings 4, 4 with the sealing members 14a, 14b assembled, and the thin motor 1 with the rolling bearings 4, 4 assembled cannot be raised excessively.

Moreover, in the case of this embodiment, the film material 19 constituting the sealing members 14a, 14b has a good foreign substance blocking performance, such as a gas barrier property as well as an extremely small performance change by heat, moisture, or aging. Therefore, a good sealing performance can be obtained in terms of the corrosion prevention for the installation part of the balls 12, 12, the deterioration prevention of a grease sealed inside the installation part of the balls 12, 12, or the like as well as the good sealing performance can be maintained over a long time. Furthermore, also in the case of using an adhesive having a stickiness is used as the adhesives 18, 18, drying of the adhesives 18, 18 can be prevented effectively, and thus the bonding force (adhesion force) of the adhesives 18, 18 can be maintained over a long time.

Figure 6:
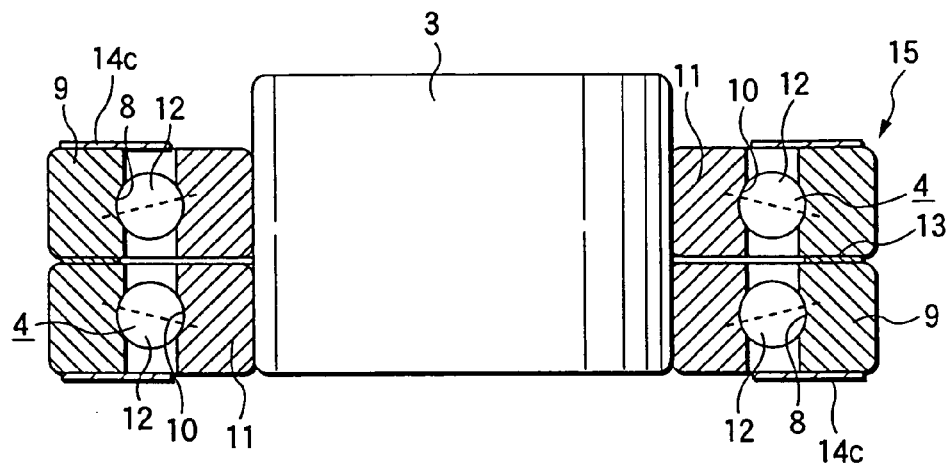
FIG. 6 is an enlarged cross-sectional view of a pair of rolling bearings and a rotation axis of a second embodiment of the invention.

Next, FIG. 6 shows a second embodiment of the invention. In the case of this embodiment, sealing members 14c, 14c for closing both end openings of a space provided with a plurality of balls 12, 12 are formed in a round ring-like shape. Moreover, the inner diameter size of the sealing members 14c, 14c is made slightly larger than the outer diameter size of inner rings 11, 11 constituting a pair of rolling bearings 4, 4. In other words, in the case of this embodiment, in the assembled state shown in the figure, the inner diameter side part of the sealing members 14c, 14c is not superimposed on a part of the inner rings 11, 11 in the axial direction. Thereby, in the case of this embodiment, the outer end surface of the inner rings 11, 11 is disposed on the same plane as the outer end surface of the outer rings 9, 9 for supporting and fixing the sealing members 14c, 14c. The other configuration and effects are same as the first embodiment described above.

Figure 7:
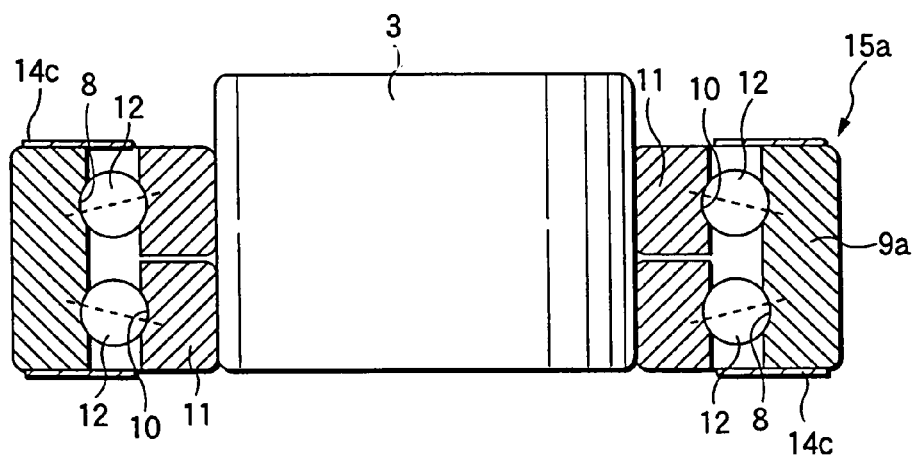
FIG. 7 is an enlarged cross-sectional view of a pair of rolling bearings and a rotation axis of a third embodiment of the invention.

Next, FIG. 7 shows a third embodiment of the invention. In the case of this embodiment, double row outer ring raceway tracks 8, 8 constituting a double row rolling bearing 15a are provided on the inner circumferential surface of a single outer ring 9a. The other configuration and effects are same as the second embodiment described above.

Figure 8:
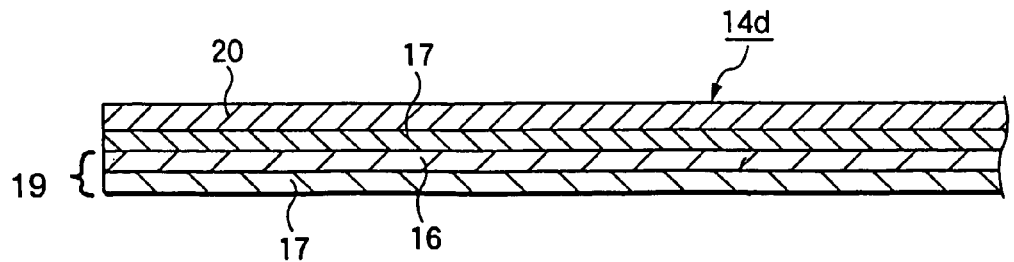
FIG. 8 is an enlarged cross-sectional view of another embodiment of a sealing member similar to FIG. 5.

Next, FIG. 8 shows another embodiment of the sealing member. A sealing member 14d of this embodiment has a bonding film 20 made of a polyethylene film, or the like laminated on a part facing at least the axial direction end surface of a bearing ring (outer ring or inner ring) for supporting and fixing the sealing member 14d on one side surface of a film material 19 in a predetermined shape, such as a round shape, and a round ring-like shape. In the case of fixing such a sealing member 14d on the bearing ring, the bonding film 20 is heated in the state with the surface of the bonding film 20 closely contacted on the entire circumference of the axial direction end surface of the bearing ring. Accordingly, the closely contacted part of the bonding film 20 is melted for welding and fixing the sealing member 14d on the axial direction end surface of the bearing ring. In this specification, a bonding method such as welding without using an adhesive is included in bonding.

Although the structure of the thin motor 1 with the rotation axis 3 supported rotatably by the double row rolling bearing 15, 15a with respect to the fixing member 2 is shown in the above-mentioned embodiments, as the thin motor according to the invention, a structure with the rotating member supported rotatably by a rolling bearing around a fixed axis fixed on a fixing member can also be adopted.

Hereinafter, embodiments of the invention will be explained.

FIGS. 9A and 9B are a cross-sectional view showing a rolling bearing and a bearing device according to a fourth embodiment of the invention.

The rolling bearing of this embodiment is a double row ball bearing 101. The double row ball bearing 101 comprises two inner rings 104, 105 and two outer rings 106, 107, with the entire inner circumferential surface of the first inner ring 104 covered with the second inner ring 105. The width of the second inner ring 105 is 1.2 mm, and the width of the inner circumferential part 142 of the first inner ring 104 is about ⅓ thereof.

Balls 131, 132 of the double row ball bearing 101 are disposed offset with each other in the bearing radial direction. The ball 131 in one row (first row) is provided on the outer side with respect to the ball 132 in the other row (second row) with respect to the bearing radial direction. The diameter difference of the ball 131 pitch circle and the ball 132 pitch circle is about 104 times as much as the diameter of the balls 131, 132. The balls 131, 132 in the two rows are arranged at positions away by the radius of the balls 131, 132 in the axial direction by the central point distance of the balls 131, 132.

Although the first outer ring 106 has an ordinary outer ring shape, the second outer ring 107 comprises an inner circumferential part 173 having a raceway surface, an intermediate part 174 to be disposed at the first row ball 131 position in the radial direction, and an outer circumferential part 175 to be pressured against the side surface of the first outer ring 106. The width of the first outer ring 106 is formed larger than the width of the outer circumferential part 175 of the second outer ring 107.

Although the second inner ring 105 has an ordinary inner ring shape, the first inner ring 104 comprises an outer circumferential part 141 having a raceway surface, and an inner circumferential part 142 on the axial side. The width of the inner circumferential part 142 of the first inner ring 104 is formed narrower than the width of the outer circumferential part 141. The width of the second inner ring 105 is formed larger than the width of the inner circumferential part 142 of the first inner ring 104.

Both end surfaces of the double row ball bearing 101 in the bearing width direction are covered with synthetic resin (for example, polypropylene, polyethylene, polyester, or the like) sheets 102, 103. These sheets 102, 103 have a disc-like shape having a central hole 121, 133 with a 100 μm thickness.

The sheet 102 disposed on the end surface at the first outer ring 106 side has an outer diameter same as the outer diameter of the first outer ring 106, and an inner diameter of a size between the inner diameter of the second inner ring 105 and the outer diameter thereof. A knob part 123 is formed in the sheet 102 at a part in the inner circumferential part of a disc part 122. Moreover, an adhesive A is fixed on the circumferential rim part surface of the central hole 121 of the sheet 102.

The sheet 102 is bonded on the end surface of the inner rings 104, 105 of the bearing 101 by the adhesive A by a detachable bonding force. The bonding force of the adhesive A with respect to the bearing 101 is a bonding force in a degree not to be peeled off from the end surfaces of the inner rings 104, 105 at the time of handling the bearing 101, but to be peeled off by holding and strongly pulling the knob part 123.

The sheet 103 disposed on the end surface on the second outer ring 107 side has an outer diameter slightly smaller than the outer diameter of the second outer ring 107, and an inner diameter slightly larger than the inner diameter of the second inner ring 105. A knob part 135 is formed in the sheet 103 at a part in the outer circumferential part of a disc part 134. Moreover, the adhesive A is fixed on the outer circumferential rim surface of the disc part 134 of the sheet 103.

The sheet 103 is bonded on the end surface of the second outer ring 107 of the bearing 101 by the adhesive A by a detachable bonding force. The bonding force of the adhesive A with respect to the bearing 101 is a bonding force in a degree not to be peeled off from the end surface of the outer ring 107 at the time of handling the bearing 101, but to be peeled off by holding and strongly pulling the knob part 135.

FIG. 9A shows the state of the double row ball bearing 101 with the sheets 102, 103 mounted, assembled in a housing H. The housing H has a shape with a ring part H1 and an outward flange H2 formed integrally. The outer rings 106, 107 of the double row ball bearing 101 are fixed in the ring part H1 by bonding or press-in.

FIG. 9B shows the state with an axis side member 108 assembled in the double row ball bearing 101. The axis side member 108 has a shape with a cylindrical part 181 and an outward flange 182 formed integrally. A pressuring member 182a for pressuring the second inner ring 105 in the axial direction is formed in the outward flange 182.

In assembling the axis side member 108 in the double row ball bearing 101, first, the sheet 102 disposed on the first outer ring 106 side end surface is peeled off by holding and strongly pulling the knob part 123. Next, the cylindrical part 181 of the axis side member 108 is inserted from the first outer ring 106 side end surface into the second inner ring 105 until the pressuring member 182a is contacted with the second inner ring 105 end surface. The cylindrical member 181 and the second inner ring 105 are fixed by bonding or press-in.

Accordingly, a bearing device with the double row ball bearing 101 disposed between the housing H and the axis side member 108, one end side of the double row ball bearing 101 in the axial direction (first outer ring 106 side) covered with the outward flange part 182 of the axis side member 108, and the other end side in the axial direction (second outer ring 107 side) covered with the sheet 103 can be obtained.

In mounting the bearing device on a chassis, the sheet 103 disposed on the second outer ring 107 side end surface is peeled off by holding and strongly pulling the knob part 135, and the bearing device is mounted on the chassis.

Accordingly, by covering both end surfaces of the bearing width direction with the sheets 102, 103, entrance of dusts into the double row ball bearing 101 not provided with a seal in the bearing can be prevented until the operation of mounting on the chassis is finished. After completion of mounting on the chassis, the chassis serves as a seal. Moreover, since the central holes 121, 133 are provided in the sheets 102, 103 in this embodiment, the assembly of the axis side member 108 into the double row ball bearing 101 can be executed, with the inner circumferential circle of the second inner ring 105 as the reference, and the assembly of the bearing device onto the chassis, with the inner circumferential circle of the cylindrical part 181 of the axis side member 108 as the reference, respectively.

Besides, according to the bearing device of this embodiment, since the balls 131, 132 in the two rows are disposed offset in the bearing radial direction, and the first inner ring 104 and the second outer ring 107 are arranged such that the outer circumferential part 141 of the inner ring 104 is outside with respect to the inner circumferential part 173 of the outer ring 107 in the radial direction, the width of the double row bearing can be made smaller. Moreover, since the first inner ring 104 is provided outside the second inner ring 105, preliminary pressure adjustment can be executed before mounting on the axis side member 108. The mark S in FIGS. 9A and 9B denote a gap for the preliminary pressure adjustment.

FIG. 10 is a cross-sectional view showing a bearing device according to a fifth embodiment of the invention. Similar to that of FIG. 9B, the bearing device has a double row ball bearing 101 disposed between a housing H and an axis side member 108, one end side of the double row ball bearing 101 in the axial direction (first outer ring 106 side) covered with an outward flange part 182 of the axis side member 108, and the other end side in the axial direction (second outer ring 107 side) covered with the sheet 130.

The outer diameter part 134 of the sheet 130 is slightly larger than the outer diameter of the ring part H1 of the housing H1, and the central hole 133 of the sheet 130 has an inner diameter same as the inner diameter of the cylindrical part 181 of the axis side member 108. A knob part 135 is formed in the sheet 130 at a part in the outer circumferential part of a disc part 134. Moreover, the adhesive A is fixed on the outer circumferential rim surface of the disc part 134 of the sheet 130.

The sheet 130 is bonded on the outward flange part H2 of the housing H by the adhesive A by a detachable bonding force. The bonding force of the adhesive A with respect to the outward flange part H is a bonding force in a degree not to be peeled off from the outward flange part H at the time of handling the bearing device, but to be peeled off by holding and strongly pulling the knob part 135.

Therefore, according to the bearing device of this embodiment, entrance of dusts into the double row ball bearing 101 not provided with a seal in the bearing can be prevented until the mounting operation on a chassis. Moreover, since the structure of the double row ball bearing 101 is same as that of the fourth embodiment, the above-mentioned effects derived from the structure of the double row ball bearing 101 can be obtained as in the fourth embodiment.

Figure 11:
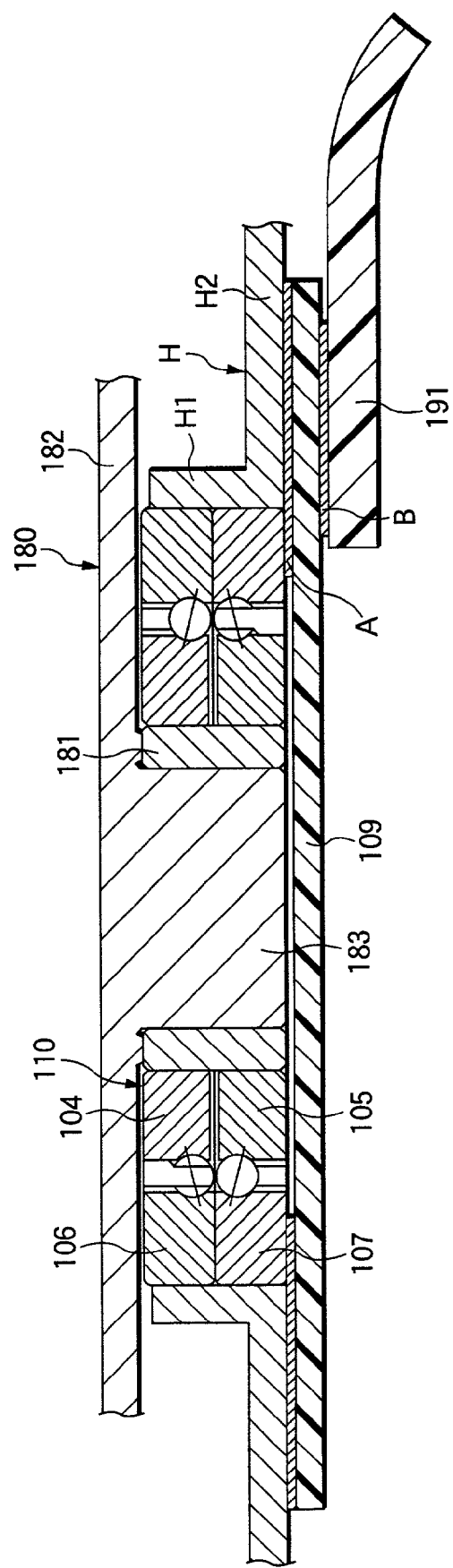
FIG. 11 is a cross-sectional view showing a bearing device according to a sixth embodiment of the invention.

FIG. 11 is a cross-sectional view showing a bearing device according to a sixth embodiment of the invention. This bearing device comprises a double row ball bearing 110 disposed between a housing H and an axis side member 180, one end side of the double row ball bearing 110 in the axial direction (first outer ring 106 side) covered with a pressuring member 182 of the axis side member 180, and the other end side in the axial direction (second outer ring 107 side) covered with a sheet 109.

Unlike the fourth and fifth embodiments, the double row ball bearing 110 has balls in two rows disposed at a same position in the radial direction of the bearing, and two inner rings 104, 105 and outer rings 106, 107 having a same width, formed in a certain width in the entire radial direction. The housing H has the same shape as in the fourth and fifth embodiments. The axis side member 180 has a cylindrical part 181 and an outward flange part 182 independently, with the outward flange part 182 formed integrally with an axis 183.

The sheet 109 is a disc-like member having an outer diameter larger than the outer diameter of the ring part H1 of the housing H, without a central hole formed. An adhesive A is fixed on the outer circumferential rim surface of the sheet 109. The sheet 109 is bonded on the end surface of the outward flange part H2 of the housing H and the outer ring 107.

Moreover, a tape 191 is fixed also on the surface of the outer rim part of the sheet 109 by an adhesive B on the opposite side with respect to the surface with the adhesive A fixed. The bonding force between the sheet 109 and the tape 191 by the adhesive B is sufficiently stronger than the bonding force between the outer ring 107 and the outward flange part H2 by the adhesive A. The bonding force of the adhesive A with respect to the sheet 109 is a bonding force in a degree not to be peeled off from the end surface of the outward flange part H2 of the housing H and the outer ring 107 at the time of handling the bearing device, but to be peeled off easily by holding and strongly pulling the tape 191.

Therefore, according to the bearing device of this embodiment, entrance of dusts into the double row ball bearing 101 not provided with a seal in the bearing can be prevented until the mounting operation on a chassis. Moreover, since the tape 191 for detaching the sheet 109 is fixed on the sheet 109 without having a central hole or a knob part in the sheet 109, the sheet 109 can be produced more easily than the sheets 102, 103 of the fourth and fifth embodiments. Furthermore, by bonding the tape 191 on the sheet 109 immediately before detaching the sheet 109, the handling operation before the detachment is not disturbed by the tape 191.

Although the sheets 102, 103, 109 have a shape substantially covering the entirety of the end surface in the bearing width direction in these embodiments, any shape can be adopted for the sheets 102, 103, 109 as long as the gap between the inner ring and the outer ring can be covered certainly. Moreover, although the knob parts 123, 135 and the tape 191 are provided in these embodiments as a means for detaching the sheets 102, 103, 109, they are not essential. For example, the sheet can be detached, utilizing the central hole of the sheet, or the gap between the sheet and the rolling bearing or the bearing device.

FIG. 12 is a cross-sectional view showing a rolling bearing device according to a seventh embodiment of the invention. Although the rolling bearing device is similar to the bearing device of the fifth embodiment, it differs from the fifth embodiment in that a knob part 135 is not provided in a sheet 130 and an adhesive C is used instead of the adhesive A.

The adhesive C is an adhesive with the bonding force to be lowered by the ultraviolet ray irradiation. The bonding force of the adhesive C with respect to the outward flange part H2 is a bonding force in a degree not to be peeled off from the end surface of the outward flange part H2 (higher than the adhesive A) at the time of handling the bearing device, but the bonding force is lowered in a degree to be peeled off easily with a vacuum pincette 400, or the like after the ultraviolet ray irradiation as shown in FIG. 12B. At the time of peeling off the sheet 130, the adhesive C is irradiated with the ultraviolet ray from the outer circumferential surface side of the sheet 130. Or in the case the sheet 130 is ultraviolet ray permeable, the sheet 130 can be peeled off by the ultraviolet ray irradiation to the adhesive C via the sheet 130.

As such an adhesive, for example, an ultraviolet ray peel-off type adhesive tape (a tape produced by providing an ultraviolet ray peel-off type adhesive layer on a film (base material) made of an ultraviolet ray permeable polyolefin, or the like) with the adhesive layer and the film partially eliminated, can be used as an integral product of the sheet 130 and the adhesive C. Such an ultraviolet ray peel-off type adhesive tape is available from Surion Tech Corp., Furukawa Denki Kogyo Corp., or the like.

Therefore, according to the bearing device of this embodiment, entrance of dusts into the double row ball bearing 101 not provided with a seal in the bearing can be prevented until the mounting operation of the bearing device on a chassis. Moreover, since the adhesive C with the bonding force to be lowered by the ultraviolet ray irradiation is used, the sheet 130 cannot be peeled off at the time of handling, but the sheet 130 can be peeled off easily by a force smaller than that of the fifth embodiment as needed.

Figure 13:
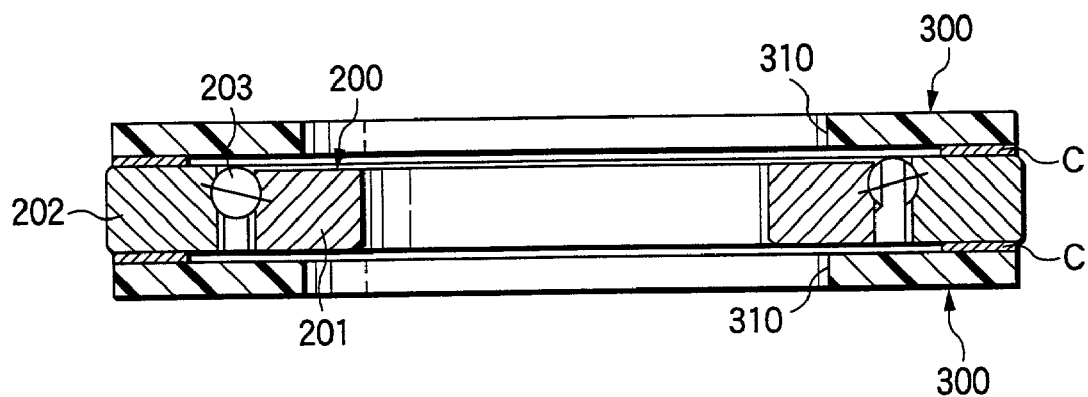
FIG. 13 is a cross-sectional view showing a rolling bearing according to a eighth embodiment of the invention.

FIG. 13 is a cross-sectional view showing a rolling bearing device according to a eighth embodiment of the invention. The rolling bearing 200 is a single row ball bearing comprising an inner ring 201, an outer ring 202, and a ball 203. Both end surfaces of the rolling bearing 200 in the bearing width direction are covered with ultraviolet ray permeable synthetic resin (for example, polypropylene, polyethylene, polyester, or the like) sheets 300.

These sheets 300 have a disc-like shape having a central hole 310 with a 100 µm thickness. The outer diameter thereof has a size slightly smaller than the outer diameter of the outer ring 202. Moreover, the adhesive C same as that of the seventh embodiment is fixed on the surface of a part of the disc outer circumferential rim in the sheets 300. The sheets 300 are bonded on both end surfaces of the outer ring 202 of the bearing 200 by the adhesive C. In peeling off the sheets 300, the adhesive C is irradiated with the ultraviolet ray via the sheets 300.

Therefore, according to the bearing device of this embodiment, entrance of dusts into the single row ball bearing 200 not provided with a seal in the bearing can be prevented at the time of assembling the bearing 200 into the axis and the housing. Moreover, since the adhesive C with the bonding force to be lowered by the ultraviolet ray irradiation is used, the sheets 300 cannot be peeled off at the time of handling, but the sheets 300 can be peeled off by a small force as needed.

Figure 14:
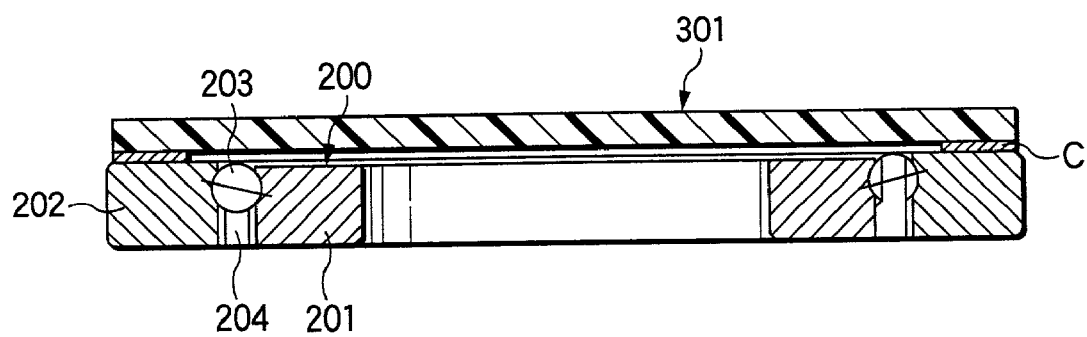
FIG. 14 is a cross-sectional view showing a rolling bearing according to a ninth embodiment of the invention.

FIG. 14 is a cross-sectional view showing a rolling bearing device according to a ninth embodiment of the invention. The rolling bearing 200 is a single row ball bearing as in the eighth embodiment. One end surface of the rolling bearing 200 in the bearing width direction (end surface on the crown shaped holding device 204 pocket side) is covered with a sheet made of the material same as that of the sheet 300 of the eighth embodiment. The sheet 301 has a disc-like shape without a central hole, with a 100 μm thickness. The outer diameter thereof has a size slightly smaller than the outer diameter of the outer ring 202.

Moreover, the adhesive C same as that of the seventh embodiment is fixed on the surface of a part of the disc outer circumferential rim in the sheet 301. In peeling off the sheet 301, the adhesive C is irradiated with the ultraviolet ray via the sheet 301.

Therefore, according to the bearing device of this embodiment, entrance of dusts into the single row ball bearing 200 not provided with a seal in the bearing can be prevented at the time of assembling the bearing 200 into the axis and the housing. Moreover, since the adhesive C with the bonding force to be lowered by the ultraviolet ray irradiation is used, the sheet 301 cannot be peeled off at the time of handling, but the sheet 301 can be peeled off by a small force as needed.

Figure 15:
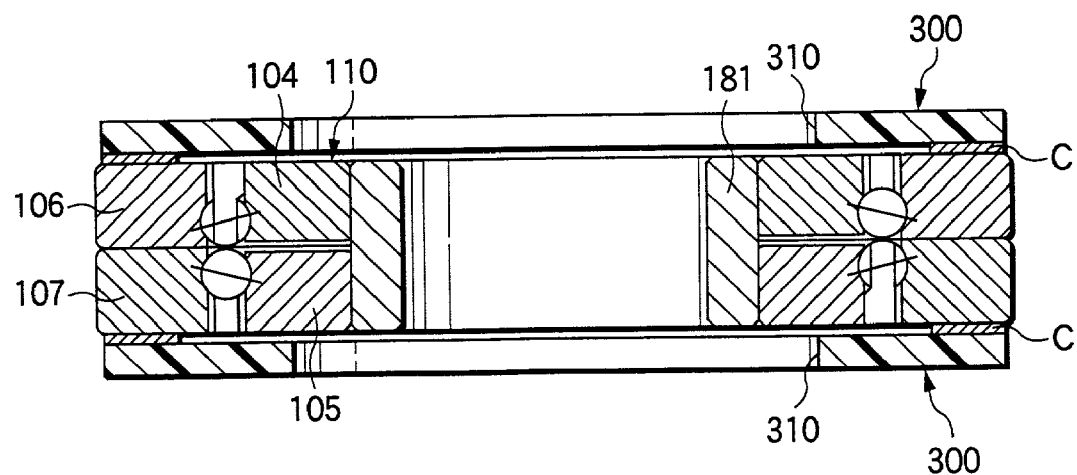
FIG. 15 is a cross-sectional view showing a bearing device according to a tenth embodiment of the invention.

FIG. 15 is a cross-sectional view showing a rolling bearing device according to a tenth embodiment of the invention. This rolling bearing device comprises a double row ball bearing 110 same as that of the sixth embodiment mounted on a cylindrical part 181 as an axis side member. Both end surfaces of the double row ball bearing 110 in the axis direction are covered with sheets 300 same as that of the eighth embodiment, with the sheets 300 fixed by an adhesive C same as that of the seventh embodiment, disposed at a position same as that of the eighth embodiment.

The sheets 300 are bonded on the end surfaces of the outer rings 106, 107 of the double row ball bearing 200 by the adhesive C. In peeling off the sheets 300, the adhesive C is irradiated with the ultraviolet ray via the sheets 300.

Therefore, according to the bearing device of this embodiment, entrance of dusts into the double row ball bearing 110 not provided with a seal in the bearing can be prevented at the time of assembling the bearing 110 into the axis and the housing. Moreover, since the adhesive C with the bonding force to be lowered by the ultraviolet ray irradiation is used, the sheets 300 cannot be peeled off at the time of handling, but the sheets 300 can be peeled off by a small force as needed.

Figure 16:
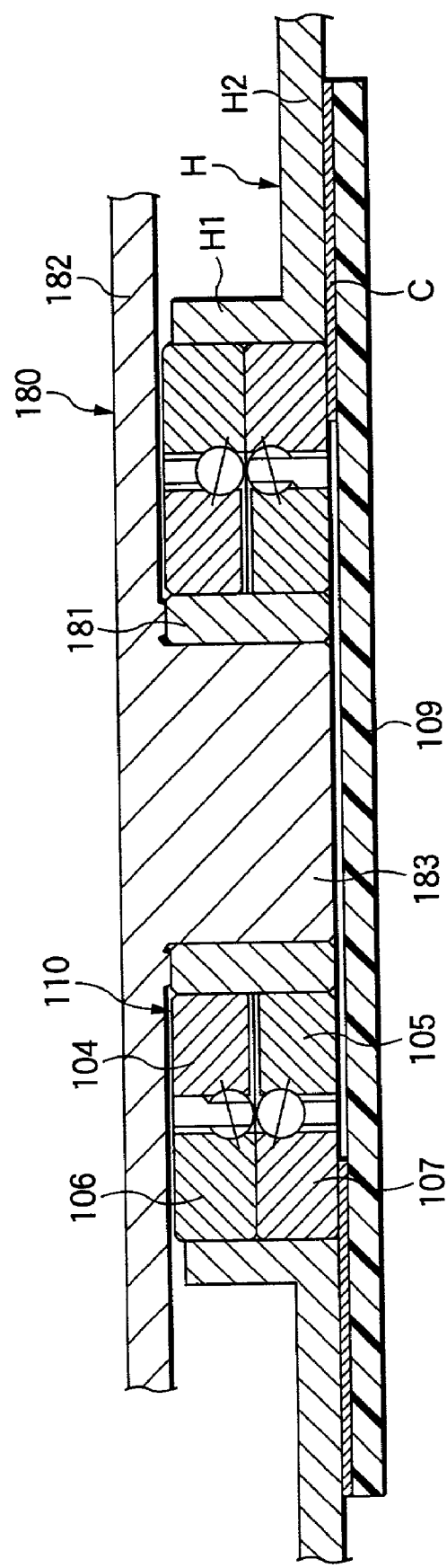
FIG. 16 is a cross-sectional view showing a bearing device according to an eleventh embodiment of the invention.

FIG. 16 is a cross-sectional view showing a rolling bearing device according to an eleventh embodiment of the invention. Although the rolling bearing device is similar to the bearing device of the sixth embodiment, it differs from the sixth embodiment in that a tape 191 is not provided in a sheet 109 and an adhesive C same as that of the seventh embodiment is used instead of the adhesive A.

Therefore, according to the bearing device of this embodiment, entrance of dusts into the double row ball bearing 110 not provided with a seal in the bearing can be prevented until the mounting operation of the bearing device on a chassis. Moreover, since the adhesive C with the bonding force to be lowered by the ultraviolet ray irradiation is used, the sheet 130 cannot be peeled off at the time of handling, but the sheet 130 can be peeled off easily by a force smaller than that of the sixth embodiment as needed.

In addition to the above-mentioned adhesives A, C, a configuration using an adhesive with the bonding force to be lowered by the heat application is included in the rolling bearing and the bearing device of the invention. As such an adhesive, for example, a thermally peel-off type adhesive tape (a tape produced by providing a thermally peel-off type adhesive layer on a film (base material) made of a PET, or the like) with the adhesive layer and the film partially eliminated, can be used as an integral product of the sheet and the adhesive C. As such a thermally peel-off type adhesive tape, the thermally peel-off sheet "Riba Alpha" of Nitto Denkogyo Corp., or the like can be presented.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Since the sealing member, the rolling bearing, and the thin motor according to the invention have the above-mentioned configuration and effects, the sealing member can be assembled easily on the rolling bearing even in the case the axial direction size of the rolling bearing and the thin motor with the rolling bearing assembled is made sufficiently small. Furthermore, a good sealing performance can be provided by the sealing member.

As heretofore explained, according to the invention, entrance of dusts into the rolling bearing not provided with a seal within the bearing can be prevented.

In particular, according to the rolling bearing or the bearing device, by having the bonding force of the adhesive considerably high, the sheet is not peeled off at the time of handling as a rolling bearing or a bearing device, but it can be peeled off easily at the time of peeling off the sheet.

What is claimed is:

1. A rolling bearing comprising:
   an inner ring, an outer ring, and a plurality of rolling elements rotatably disposed therebetween and a space accommodating said rolling elements and having at least one end part opening opened in an axial direction thereof, wherein the space is formed between the inner circumferential surface of the outer ring and the outer circumferential surface of the inner ring, and
   a sealing film covering said space, said sealing film comprising:
   a first portion substantially covering at least a part of the end part opening of the space;
   a second portion being bonded and fixed to an axial direction extreme endmost surface of one of the inner and outer rings;
   a core layer; and
   an aluminum or alumina film disposed on said core layer.

2. The rolling bearing according to claim 1, further comprising:
   an adhesive layer further disposed on said aluminum or alumina film, said adhesive layer constituting the second portion.

3. The rolling bearing according to claim 2, wherein said sealing film is substantially formed into a circular shape.

4. The rolling bearing according to claim 3, wherein said sealing film is substantially formed into an annular shape.

5. The rolling bearing according to claim 3, wherein said sealing film has a knob portion which is outwardly protruded therefrom in an radial direction.

6. The rolling bearing according to claim 4, wherein said sealing film has a knob portion which is outwardly protruded therefrom in an radial direction.

7. The rolling bearing according to claim 4, wherein said sealing film has a knob portion which is inwardly protruded therefrom in an radial direction.

8. The rolling bearing according to claim 1, wherein the second portion is bonded and fixed to the axial direction end surface with a predetermined detachable bonding force.

9. The rolling bearing according to claim 1, wherein the second portion is bonded and fixed to the axial direction end surface through an adhesive having a predetermined detachable bonding force which is lowerable when the adhesive is subject to an ultraviolet ray irradiation.

10. The rolling bearing according to claim 1, wherein the second portion is bonded and fixed to the axial direction end surface through an adhesive having a predetermined detachable bonding force which is lowerable when the adhesive is heated.

11. A thin motor comprising:
a first member on which a stator is supported and fixed;
a second member on which a rotor facing the stator is supported and fixed; and
a rolling bearing relatively and rotatably combining said second member with said first member;
wherein the outer diameter size of the rotor is seven times or more as much as the axial direction size of the motor as a whole, and
wherein said rolling bearing comprises,
an inner ring;
an outer ring;
a plurality of rolling elements rotatably disposed therebetween and accommodated with a space which has at least one end part opening opened in the axial direction thereof and is formed between the inner circumferential surface of the outer ring and the outer circumferential surface of the inner ring; and
a sealing film including a first portion substantially covering at least a part of the end part opening of the space, and a second portion being bonded and fixed to the axial direction end surface of at least one of said inner and outer rings.

12. The thin motor according to claim 11, wherein said sealing film comprises:
a core layer;
an aluminum or alumina film disposed on said core layer; and
an adhesive layer further disposed on said aluminum or alumina film, said adhesive layer constituting the second portion.

13. A thin motor comprising:
a first member on which a stator is supported and fixed;
a second member on which a rotor facing the stator is supported and fixed; and
a rolling bearing, according to claim 1, relatively and rotatably combining said second member with said first member.

14. The thin motor according to claim 13, wherein the outer diameter size of the rotor is seven times or more as much as the axial direction size of the motor as a whole.

* * * * *